Feb. 21, 1933.                J. R. RITCHIE                 1,898,312
                              TRACTOR SCRAPER
                           Filed Feb. 8, 1932              7 Sheets-Sheet 1
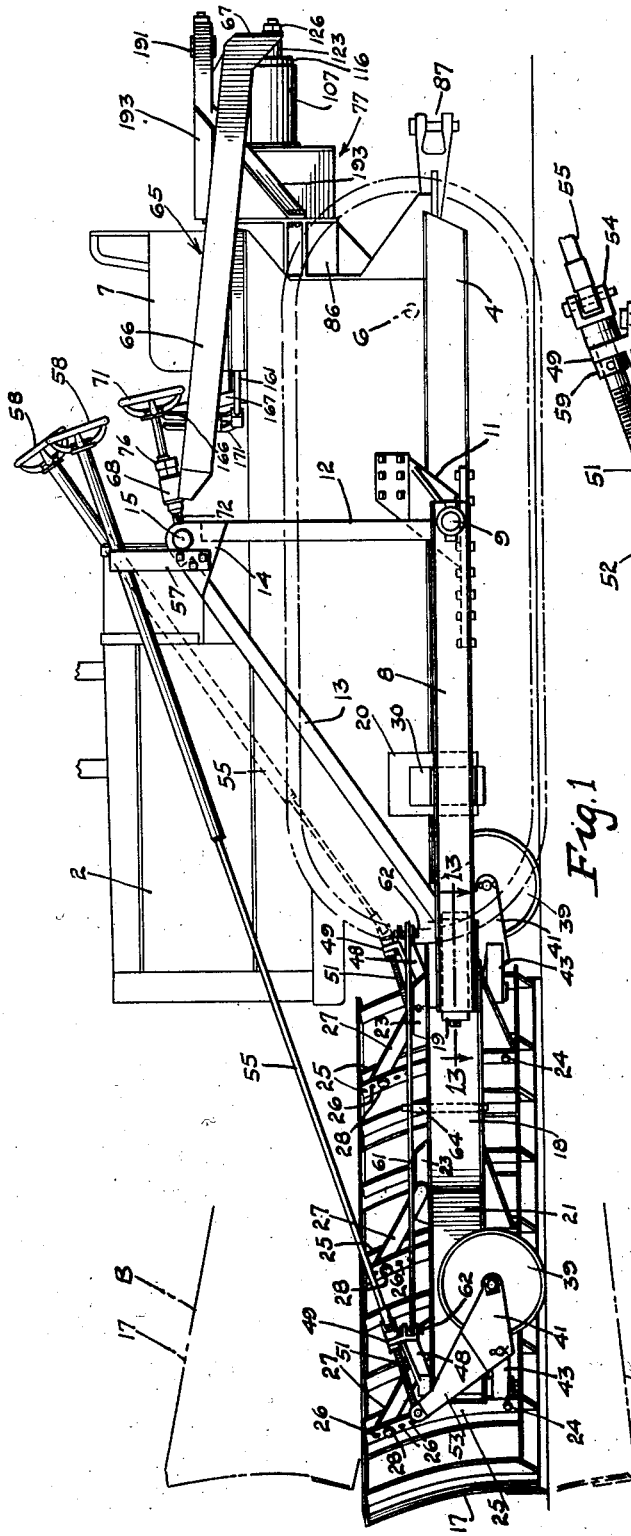
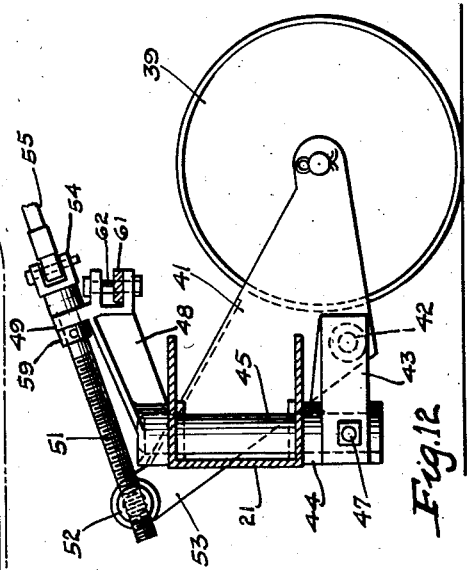
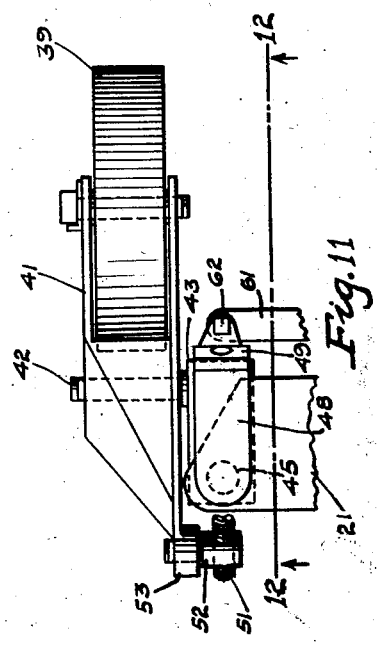
INVENTOR
JOHN R. RITCHIE
BY
ATTORNEYS Feb. 21, 1933. J. R. RITCHIE 1,898,312
TRACTOR SCRAPER
Filed Feb. 8, 1932 7 Sheets-Sheet 2
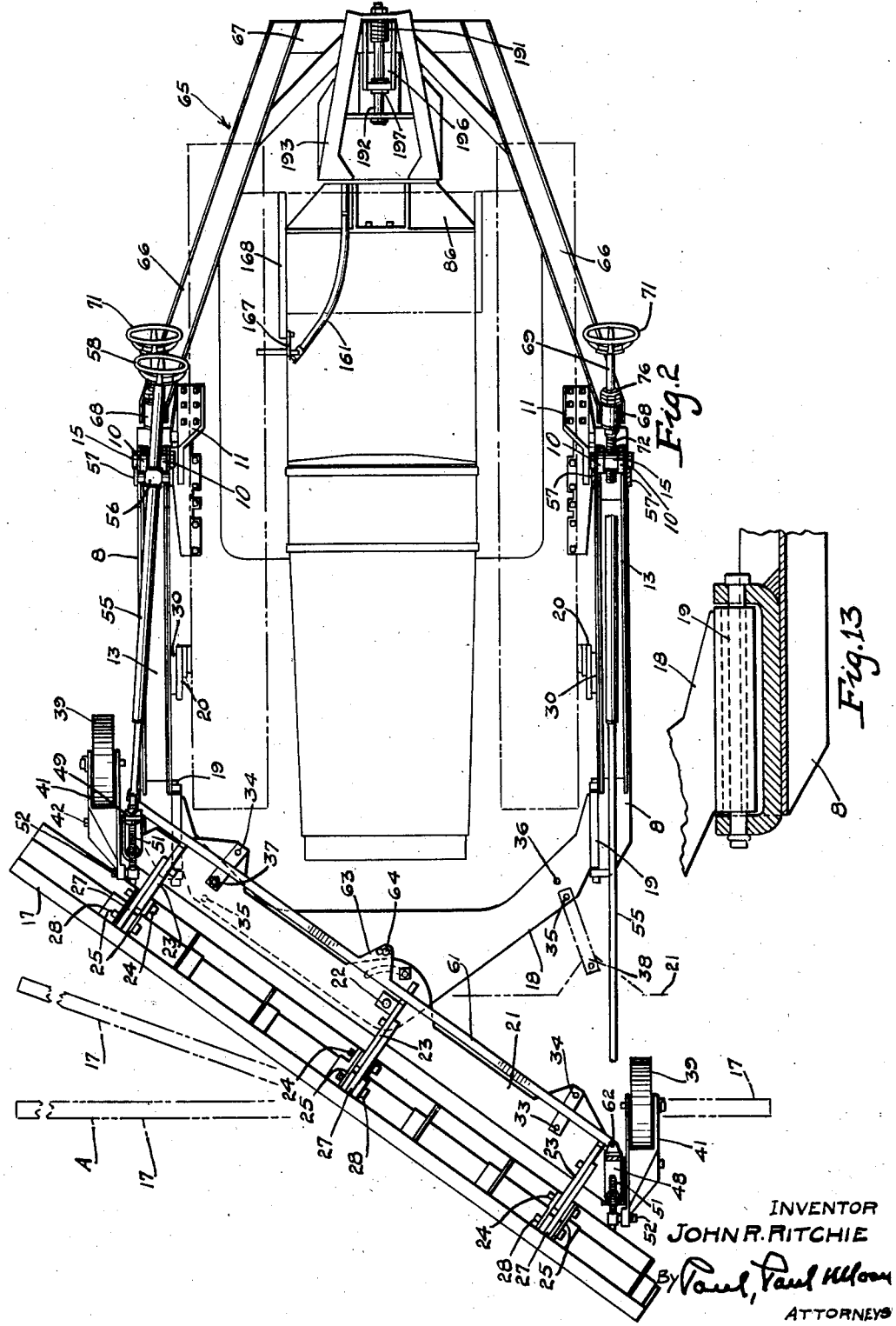
INVENTOR
JOHN R. RITCHIE
By Paul, Paul Moon
ATTORNEYS Feb. 21, 1933.    J. R. RITCHIE    1,898,312
TRACTOR SCRAPER
Filed Feb. 8, 1932    7 Sheets-Sheet 3
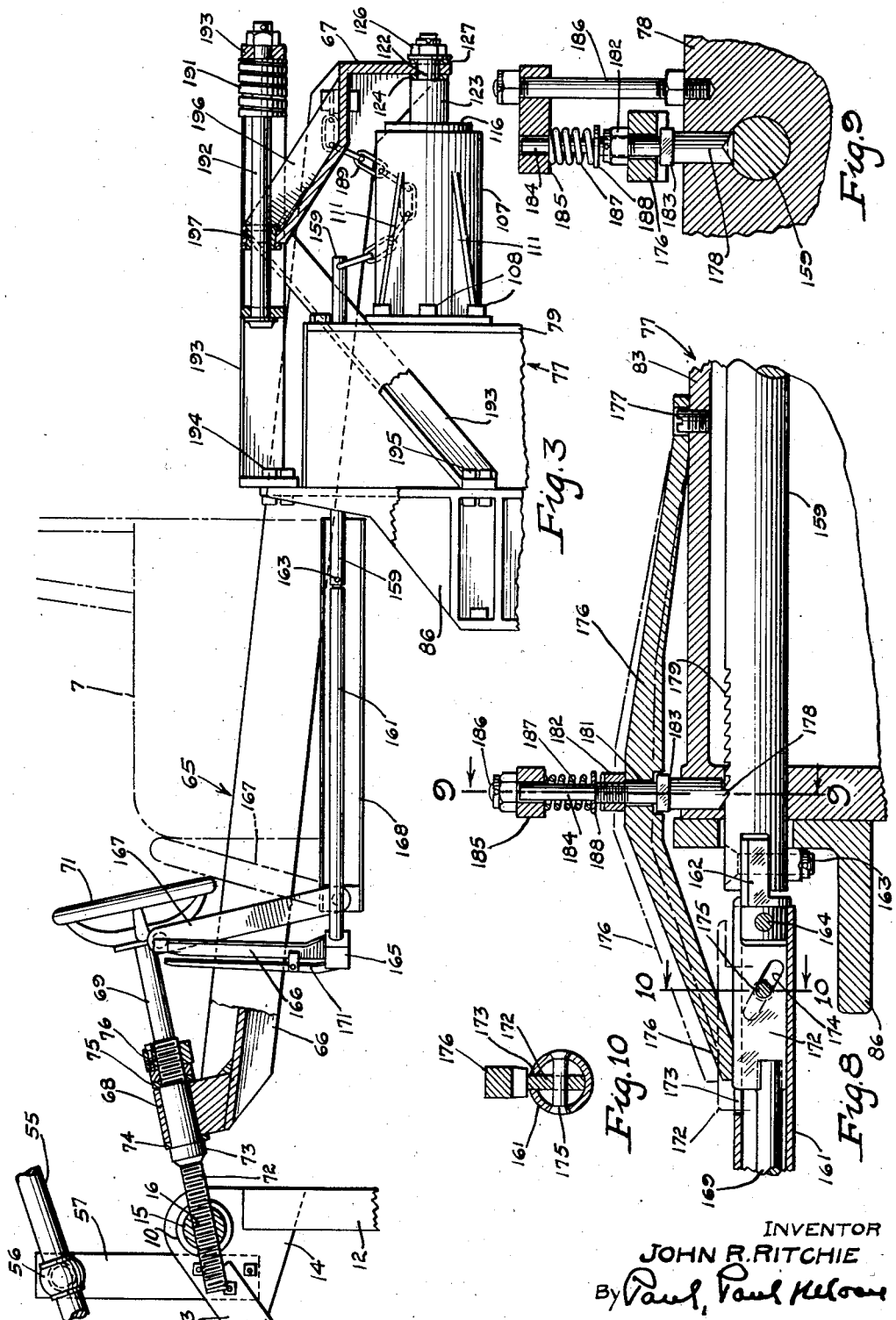
INVENTOR
JOHN R. RITCHIE
By Paul, Paul Keloug
ATTORNEYS Feb. 21, 1933.   J. R. RITCHIE   1,898,312
TRACTOR SCRAPER
Filed Feb. 8, 1932   7 Sheets-Sheet 4
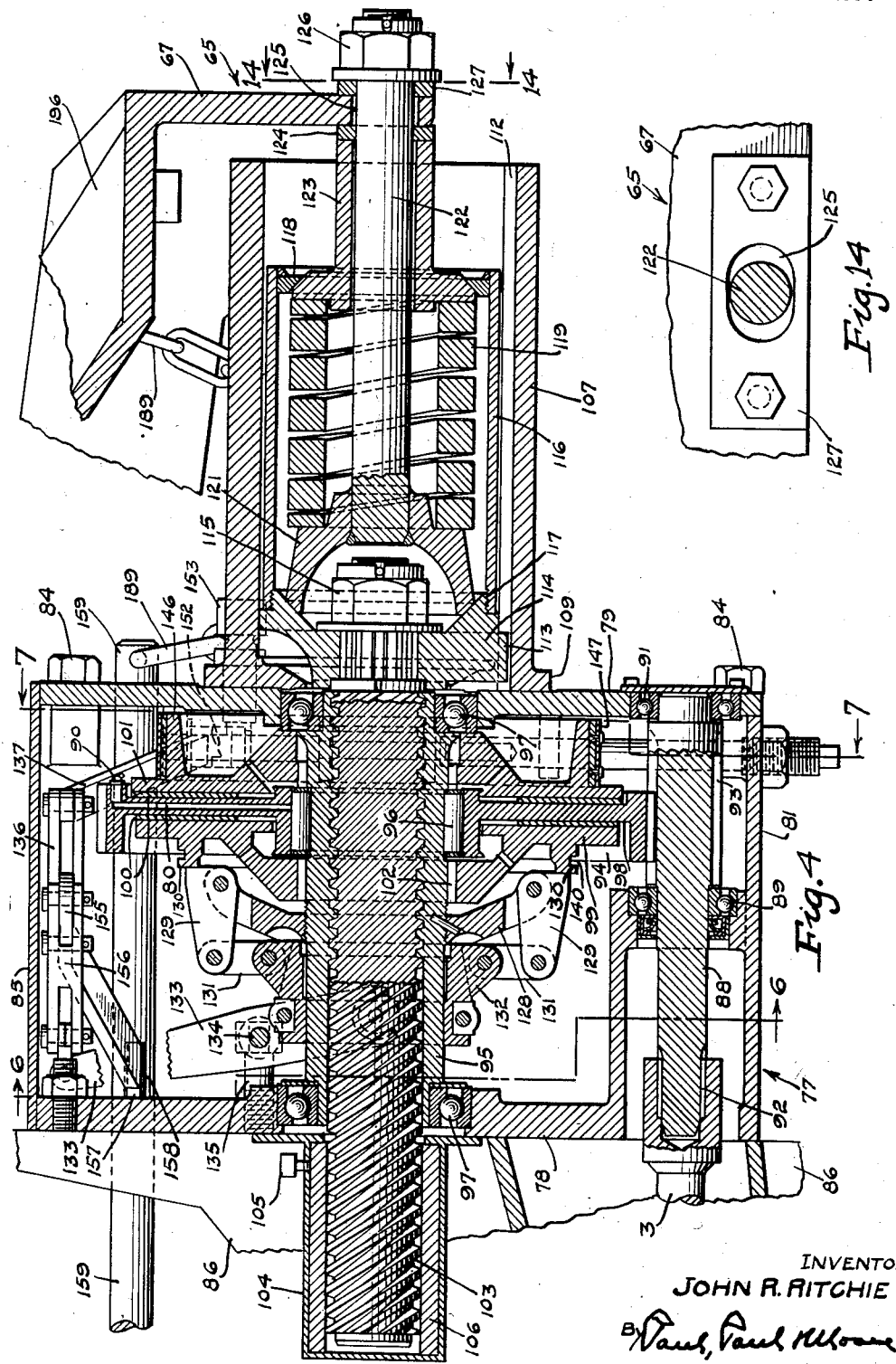
INVENTOR
JOHN R. RITCHIE
ATTORNEYS

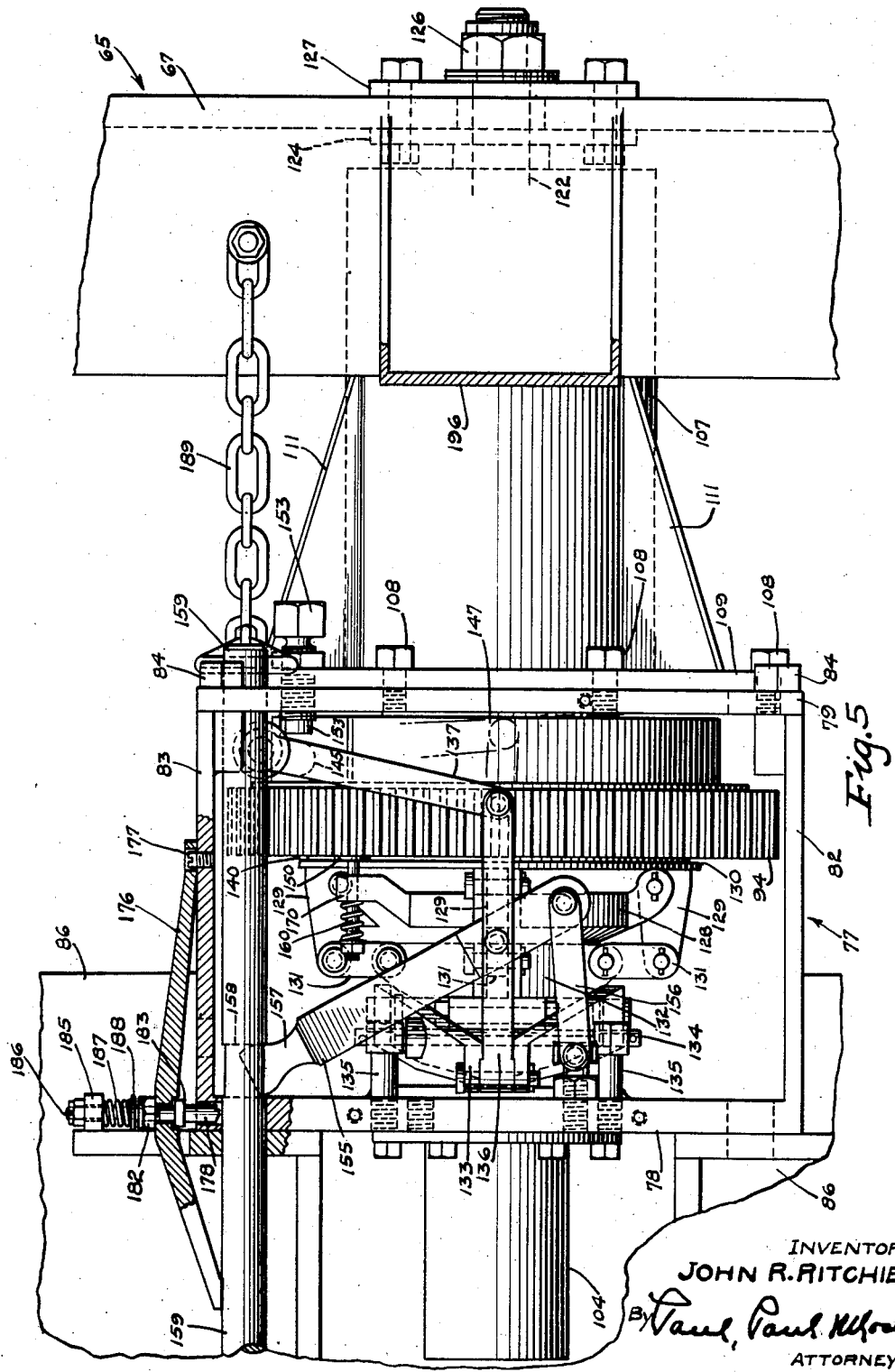

Feb. 21, 1933. J. R. RITCHIE 1,898,312
TRACTOR SCRAPER
Filed Feb. 8, 1932 7 Sheets-Sheet 6

INVENTOR
JOHN R. RITCHIE
ATTORNEYS

Feb. 21, 1933.  J. R. RITCHIE  1,898,312
TRACTOR SCRAPER
Filed Feb. 8, 1932  7 Sheets-Sheet 7

INVENTOR
JOHN R. RITCHIE
By Paul, Paul Heloong
ATTORNEYS

Patented Feb. 21, 1933

1,898,312

UNITED STATES PATENT OFFICE

JOHN R. RITCHIE, OF MINNEAPOLIS, MINNESOTA

TRACTOR SCRAPER

Application filed February 8, 1932. Serial No. 591,703.

This invention relates to new and useful improvements in tractor scrapers of the general character commonly referred to as bulldozers, or back fillers, and which comprises a tractor or other suitable power propelled unit having a scraper blade mounted forwardly thereof adapted to engage and move dirt, snow, and other material.

An object of the invention is to provide a tractor scraper comprising a tractor of the crawler type including an engine and suitable track frames, and suitable thrust members having their rear end portions pivotally connected to said track frames and extending forwardly therefrom and having a suitable scraper blade pivotally and adjustably attached to the forward ends thereof, and an operating mechanism being provided at the rear of the tractor having operative connections with said thrust members, whereby the latter may be oscillated about their axes to relatively adjust the position of the blade with respect to the ground.

A further object is to provide an apparatus of the class described comprising a pair of thrust members adapted to be secured to the usual track frames of a crawler type tractor and extending forwardly therefrom, and a cross member connecting together the forward ends of said thrust members and having a scraper blade attached thereto, and suitable uprights being provided upon the rear portions of said thrust members to which the spaced legs of a yoke are pivotally and adjustably connected, said yoke extending rearwardly from said uprights and around the rear end portion of the tractor, and an operating mechanism being detachably secured to the rear end portion of the tractor and having an operative connection with the tractor engine whereby it may be operated thereby, and said operating mechanism also having a connection with the rear portion of said yoke whereby the yoke may be relatively moved or translated in a direction lengthwise of the tractor to thereby impart an oscillatory movement to said thrust members for the purpose of relatively adjusting the position of the blade with respect to the ground.

A further object is to provide in combination with a tractor of the crawler type comprising a pair of independently movable track frames, a scraper attachment comprising a pair of thrust members having their rear portions pivotally connected to the intermediate portions of said track frames, and provided at their forward ends with a scraper blade, and uprights being provided upon the rear portions of said thrust members to which the spaced legs of a yoke are adjustably connected, the rear portion of said yoke being pivotally connected to an operating mechanism mounted at the rear of the tractor, and which mechanism has a driving connection with the tractor engine, the connection between said yoke and said operating mechanism permiting free oscillatory movement of the yoke upon an axis disposed lengthwise of the apparatus to thereby allow for up-and-down movement of the track frames, resulting from traveling over rough, uneven ground, and the adjustable connections between the yoke and said uprights providing universal connections between said members, and said connections being adapted for independent adjustment whereby the forward ends of said thrust members may be adjusted vertically independently of each other to thereby transversely tilt the blade with respect to the ground level, and the general construction of the apparatus being such as to permit freedom of movement of the track frames without causing binding in any of the bearings of the apparatus.

Other objects reside in the provision of a scraper attachment for a tractor wherein the pivotal connections between the thrust members, to which the scraper blade is attached, and the tractor, are located at the lower intermediate portions of the tractor track frames, whereby the pushing power or effort exerted against the blade by the tractor will be located comparatively close to the ground level, and substantially in a horizontal line; in the means provided for preventing side play or movement of the scraper blade with respect to the tractor; in the arrangement and construction of the operating mechanism for the scraper blade whereby the usual draw bar of the tractor is unobstructed, so that the tractor may be used for propelling vehicles or implements without detaching the scraper atachment therefrom; in the means provided by which the blade may be floatingly supported so that it may follow the contour of the ground and whereby, if desired, the scraper supporting means may be secured in locked position so as to firmly hold the blade in engagement with the ground; in the novel construction of the operating mechanism whereby the blade may be quickly adjusted from one position to another, and wherein the movement imparted to the blade to thus adjust it will be smooth and uniform, and also whereby the screw thereof may travel freely backwardly and forwardly, when the clutch and brake are released, to permit the blade to follow the contour of the ground; in the novel means for detachably securing the power actuated operating mechanism to the rear portion of the tractor frame whereby it may readily be removed therefrom, when necessary, and also whereby the forces or strains transmitted to the operating mechanism, will be applied directly against the entire rear face of the tractor body; in the means provided for cushioning the force transmitted to the yoke from the operating mechanism, said cushioning means also operating to cushion the strains imparted to the rear portion of the yoke in both fore-and-aft movements thereof; and in the means provided for supporting the rear end portion of the yoke independently of the operating mechanism, and in the movable connection provided between the yoke and said operating mechanism; and in the means provided for minimizing play in the control mechanism.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a side elevation of a conventional crawler type tractor showing the novel scraper attachment mounted thereon, the tractor being shown in light lines;

Figure 2 is a plan view of Figure 1;

Figure 3 is a detail fragmentary view, partially in section, showing the operating mechanism provided at the rear of the tractor for vertically adjusting the position of the blade with respect to the ground, and also showing the means by which the thrust members or frames may be adjusted independently of each other;

Figure 4 is an enlarged longitudinal sectional view on the line 4—4 of Figure 6, showing the general construction of the interior of the operating mechanism;

Figure 5 is a plan view of Figure 4, showing the means for controlling the operation of the operating mechanism;

Figure 8 is an enlarged detail sectional view showing the means provided for locking the operating mechanism in position to retain the scraper blade in an elevated position;

Figure 9 is a cross sectional view on the line 9—9 of Figure 8;

Figure 10 is a detail sectional view on the line 10—10 of Figure 8;

Figure 11 is a plan view showing one of the wheels provided at the ends of the blade for carrying the same;

Figure 12 is a cross-sectional view on the line 12—12 of Figure 11, showing the means by which the scraper carrying wheels may be relatively adjusted to move the cutting edge of the blade into and out of engagement with the ground surface;

Figure 13 is an enlarged detail sectional view on the line 13—13 of Figure 1, showing the pivotal connections provided between the forward ends of the thrust members and the cross member interposed therebetween; and Figure 14 is a detail sectional view on the line 14—14 of Figure 4.

*Tractor*

Figure 6:
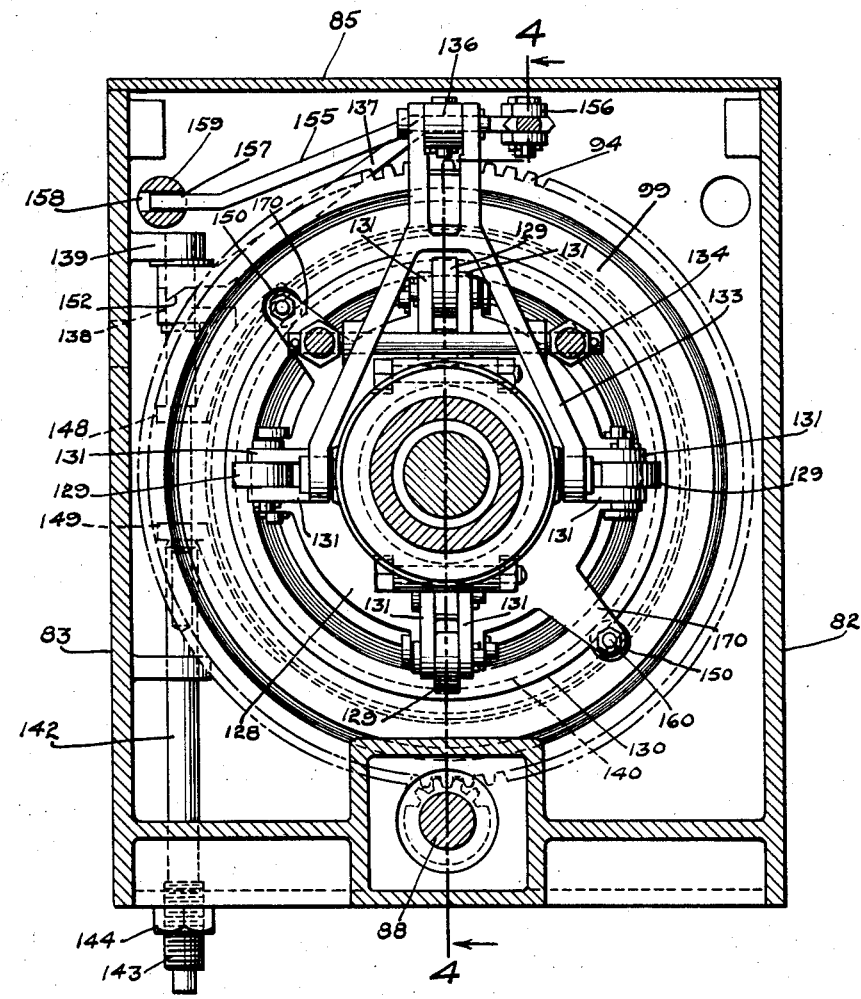
Figure 6 is a cross sectional view on the line 6—6 of Figure 4, showing the clutch operating mechanism.

In the selected embodiment of the invention here shown, there is illustrated for purposes of disclosure, a tractor of the crawler type, comprising a body 2 having en engine mounted therein and provided with a power take-off shaft 3 partially shown in Figure 4. The tractor body is pivotally mounted upon the usual track frames 4 provided with traction belts, as is customary in tractors of this general type. The track frames 4 are mounted for limited oscillatory movement about the rear axle 6, indicated in dotted lines in Figure 1, and whereby the forward ends of the track frames are adapted for up-and-down movement with respect to the tractor body, to allow for variations in the ground surface. The tractor engine may be of ordinary well-known construction, and may also be mounted in the usual manner, and it is therefore thought unnecessary to show the same in detail in the drawings. The usual operator's seat 7 is shown situated at the rear end portion of the tractor body from which position the operator may control the operation of the apparatus.

Thrust frame

The novel scraper apparatus featured in this invention is shown including a thrust frame comprising a pair of forwardly extending thrust members 8 having their rear end portions pivotally connected to the intermediate portions of the track frames 4 by suitable trunnions 9, mounted in brackets 11 which, in turn, are secured to the track frames, as shown in Figures 1 and 2. Uprights 12 are secured to the thrust members 8 at the rear portions thereof, and are situated substantially directly above the trunnions 9. Diagonal braces 13 connect the upper portions of the uprights with the forward portions of the thrust members 8, as shown in Figure 1, whereby each thrust member 8, its upright 12, and brace member 13, cooperate to provide in effect a triangular frame of rigid and rugged construction. The upper ends of the uprights and their complemental brace members 13 are shown secured together by suitable gusset plates 14. The gusset plates 14 of the uprights 12 and brace members 13, are apertured to receive suitable swivel blocks 15, here shown cylindrical in cross-section, and each provided with a threaded socket 16, the purpose of which will subsequently be described.

A cross member 18 is pivotally connected to the forward ends of the thrust members 8 by suitable hinge joints 19, best shown in Figure 13. By thus connecting the cross member 18 to the forward ends of the thrust members 8, the thrust members may oscillate up and down independently of each other, and without causing binding in the pivotal connections between the thrust members 8 and the cross member 18, it being understood that the hangers 19 have sufficient play to permit such independent movement of the thrust members. The member 18 is preferably shaped as shown. In the present instance, I have shown a scraper blade 17, commonly termed a back filler blade, adjustably attached to the forwardly extending central portion of the cross member 18 of the thrust members 8, as shown in Figures 1 and 2. Suitable wear plates 20 and 30 are secured to the track frames 4 and thrust members 8, respectively, to take up lateral strains imparted to the thrust frame.

Means for angularly adjusting blade

An index beam 21, here shown of channel cross section, is pivotally connected to the forward portion of the cross beam 18 by a suitable pin or bolt 22, as shown in Figure 2. The index beam 21 is shown provided with a plurality of forwardly extending lugs 23, and to the lower portions of these lugs, the scraper blade 17 is pivotally connected by means of pins or bolts 24, received in apertures provided in suitable angle irons 25 secured to the rear face of the blade, and as best shown in Figure 1. The upper portions of the angle irons 25 are provided with a series of spaced apertures 26 whereby the upper ends of a plurality of links 27 may be adjustably secured by suitable bolts 28. The opposite ends of the links 27 are pivotally connected to the upper webs of the lugs 23, as shown in Figure 1. By thus securing the blade to the index beam 21, the blade may be tilted to different angular positions, that is, the upper portion thereof may be tilted forwardly or rearwardly, as will readily be understood by reference to Figure 1. In the drawings, I have shown the blade secured to the lugs 23 of the index beam by means of the angle irons 25, but it is to be understood that in lieu of these angle irons, suitable lugs, not shown, may be affixed to the rear face of the blade, whereby the latter may be attached to the index beam in a similar manner.

By pivotally connecting the index beam 21 to the cross beam 18, as shown in Figure 2, the blade may also be adjusted to different angular positions transversely of the tractor, whereby the material being moved may be directed to either side of the tractor, as may be desired, and as indicated in Figure 2. To lock the index beam in a selected position, a plurality of apertures 33 and 34 are provided at each end of the index beam adapted to be moved into registration with similar apertures 35 and 36 provided in the cross beam 18. A bolt 37 is adapted to be inserted through the alined apertures of the index beam and cross beam to secure the two beams together in adjusted position, as shown in Figure 2. By the provision of four apertures in the end portions of said beams, two in each beam, as above described, the blade may be positioned in a plurality of different angular positions. It is also to be understood that when the blade is to be used as a bulldozer, it may be adjusted to a position at right angles to the longitudinal center line of the tractor and secured in such position by means of suitable links 38, indicated in dotted lines in Figure 2.

Blade carrying mechanism

Means are provided for supporting the weight of the blade and the forward end of the thrust frame, and as here shown, consists of a pair of carrying wheels 39 mounted in suitable brackets 41 pivotally mounted upon studs 42, secured to rearwardly extending arms 43 provided upon hubs 44 detachably secured to the lower ends of upright pivot pins 45, mounted in the ends of the index beam 21, as best shown in Figures 11 and 12. Bolts 47 secure the arms 43 to the pivot pins 45. Arms 48 are suitably secured to the upright ends of the pivots 45, as by welding, and are provided with lugs 49 adapted to rotatably receive threaded shafts 51, the lower end portions of which are received in threaded engagement with swivel studs 52, rotatably mounted in the forward end portions 53 of the brackets 41. The shafts 51 are provided with forked heads 54 adapted to receive the forward end portions of telescopic control rods 55. The upper ends of these rods are shown mounted in suitable guide bearings 56 provided in standards 57 secured to the uprights 12, as best shown in Figure 1. In some instances it may be found desirable to use suitable skids or runners in lieu of the carrying wheels 39.

A suitable hand wheel 58 is secured to each operating rod 55, whereby these rods may be conveniently manipulated to adjust the positions of the blade carrying wheels 39. The shafts 51 are held against longitudinal movement in the lugs 49 by means of collars 59 engaging the lower faces of the lugs 49, it being understood that the heads 54 engage the opposite faces of these lugs. The above described mechanism provides means whereby the brackets 41 may be conveniently oscillated about their pivots 42 to thereby raise or lower the cutting edge of the blade with respect to the ground surface.

Means is provided for retaining the carrying wheels 39 in parallel relation to the line of travel of the tractor and, as here shown, consists of a wheel-centering bar 61 having its terminals pivotally connected to the arms 48 of the wheel adjusting mechanism by means of bolts 62. A rearwardly extending lug 63 is shown provided upon the central portion of the wheel centering bar 61 and is pivotally connected to the central portion of the cross beam 18 by a suitable pin 64. The pin 64, it will be noted by reference to Figure 2, is located directly back of the pivot pin 22 in the longitudinal center line of the apparatus, so that when the blade is swung from one angular position to another, the wheel centering bar will swing about the axis of the pivot or stud 64, whereby a parallel link motion is obtained, resulting in the blade carrying wheels 39 always being retained in substantially true parallel relation.

*Means for vertically adjusting blade*

In apparatus of the character herein disclosed, it is desirable to provide means for bodily lifting the scraper blade to an inoperative position out of engagement with the ground, and to such an elevation that the apparatus may be readily be moved about from place to place without danger of the blade engaging the ground, and also whereby the cutting edge of the blade may be lowered to a position below the ground level. It is also desirable that means be provided whereby the blade may be held in firm contact with the ground, when operating over hard surfaces, so as to cause the blade to dig into the material and also whereby the blade may be prevented from chattering.

To thus operate the scraper blade 17, I provide a yoke 65 comprising spaced legs 66 rigidly secured to a rear cross member 67 by such means as welding, whereby the legs 66 and member 67 become in effect an integral structure. The forward end portions of the legs 66 of the yoke are provided with suitable bearings 68 adapted to rotatably receive adjusting rods or shafts 69 provided with suitable hand wheels 71, whereby these shafts may be conveniently rotated. The forward end portions 72 of the shafts 69 are threaded, as best shown in Figure 3, and are adapted to be received in the threaded sockets 16 provided in the swivel blocks 15. Collars 73 are provided upon the threaded portions 72 of the shafts 69 adapted to take up the end thrust in one direction, as will readily be understood by reference to Figure 3. Suitable thrust washers 74 are interposed between the thrust collars 73 and the bearings 68, and similar thrust washers 75 are provided at the opposite sides of the bearings 68 and are secured against shoulders provided upon the shafts by suitable lock nuts 76. By rotation of the hand wheels 71, the blade may be vertically adjusted with respect to the ground, and each end of the blade is adjustable independently of the other. It is to be understood that the rear portion of the yoke is operatively connected with the tractor engine whereby the yoke may be bodily moved in a direction lengthwise of the tractor to thereby raise or lower the forward portions of the thrust frames. Suitable collars 10 are provided upon the swivel studs or blocks 15 to limit endwise movement of said studs or blocks. The mechanism for actuating the yoke will next be described.

*Operating mechanism*

The means provided for moving the yoke 65 back and forth, in a direction lengthwise of the tractor, is here shown consisting of an operating mechanism adapted to be secured to the rear portion of the tractor body and having an operative connection with the usual power take-off shaft 3 of the tractor engine. This operating mechanism includes a casing 77 comprising a front wall 78, rear wall 79, bottom wall 81, and side walls 82 and 83. The end wall 79 may be detachably secured to the side walls 82 and 83 by suitable bolts 84. A cover plate 85 is removably secured to the upper portion of the casing by suitable bolts, not shown, whereby convenient access may be had to the interior thereof. The casing 77 is secured to the rear portion of the tractor body by means of a suitable adaptor bracket 86 which is comparatively large, as shown, in Figures 1 and 2, and may extend substantially from side to side of the tractor body so as to protect the latter against severe strains which may be transmitted thereto by the operating mechanism, when the scraper blade is being operated. By mounting the operating mechanism upon the tractor by means of an adaptor 86, as here shown, an operating mechanism of a certain size may be used for various sizes and makes of tractors, by simply providing a different adaptor for each size tractor, where necessary, thereby making it possible to standardize the operating mechanism for various sizes of tractors. It will also be noted that the adaptor is so constructed that the casing 77 will be located at suitable distance above the usual draw bar 87 of the tractor whereby the operating mechanism and yoke 66 will not interfere with the coupling of another implement or apparatus to the tractor draw bar.

Figure 7:
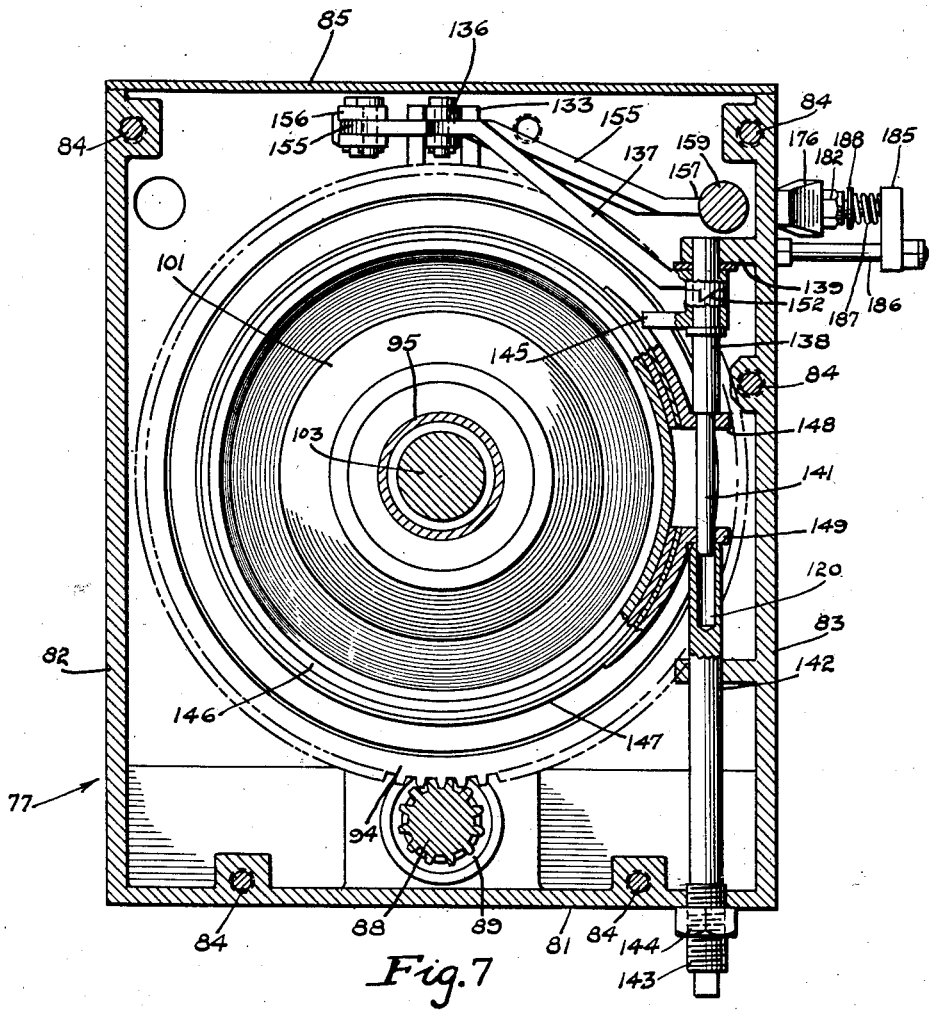
Figure 7 is a cross sectional view on the line 7—7 of Figure 4, showing the brake and the means for operating the same.

As shown in Figures 4 and 7, the operating mechanism comprises a short drive shaft 88 mounted in suitable antifriction bearings 89 and 91 provided in the lower portion of the casing 77. One end of the drive shaft 88 is splined to the power take-off shaft 3 of the tractor engine, as shown at 92 in Figure 4, and the opposite end portion thereof is provided with a plurality of gear teeth 93 which constantly mesh with a gear wheel 94 rotatably mounted upon an interiorly threaded sleeve 95, by a suitable anti-friction bearing 96. The sleeve 95 may be mounted in the end walls 78 and 79 of the casing 77 by suitable anti-friction bearings 97, as shown. The opposite faces of the web 98 of the gear wheel 94 provide friction surfaces adapted to be engaged by friction disks 99 and 101, provided with suitable facings 100. The friction disk 101 is rigidly secured to the sleeve 95 adjacent to the bearing 97 provided at the right hand side of the sleeve, when viewed as shown in Figure 4, and the disk 99 is mounted for sliding movement upon the sleeve 95, at the opposite side of the gear wheel 94, and is prevented from relatively rotating thereon by suitable splines 102. By thus mounting the disks 99 and 101 upon opposite sides of the web 98 of the gear wheel, it will readily be noted that when the disk 99 is axially moved upon the sleeve 95, the web of the gear will be frictionally clamped between the two disks, whereby the disks, gear, and sleeve will rotate as a unit. Suitable oil ducts 80 and fittings 90 are shown provided in the gear wheel 94 for lubricating the bearing 96 thereof.

A power driven screw 103 is mounted within the sleeve 95 and is received in threaded engagement therewith, so that when the sleeve is rotated, the screw will be axially moved therein. The forward end portion of the screw 103 is received in a housing 104 suitably secured to the wall 78. A suitable grease cup 105 is mounted in the upper portion of the housing 104 whereby a suitable lubricant may be introduced into said housing. A suitable wick or packing 106, preferably in the form of a sleeve, is mounted within the housing 104 and surrounds the forward end of the screw, as clearly shown in Figure 4.

A tubular member 107 is secured to the rear wall 79 of the housing 77 by suitable bolts 108, traversing an apertured flange 109 provided on said member and received in threaded sockets in the rear wall 79. Suitable strengthening ribs 111 are provided upon the tubular member 107, as best shown in Figure 5.

The tubular member 107 has a longitudinally extending key-way 112 adapted to receive a projection 113 provided upon a head 114. This head is secured to a rear terminal of the screw 103 by means of a nut 115. The projection 113 and key-way 112 prevent the screw from relatively rotating, when the sleeve 95 is rotated to axially move the screw within the housing. A cylindrical member 116 is suitably secured to the head 114 by such means as threads 117, and extends rearwardly therefrom and is provided at its rear end portion with an inwardly turned flange 118, preferably secured thereto by such means as welding. Within the sleeve 116, there is mounted a coiled compression spring 119, one end of which is seated against a member 121 secured to a short rod 122, and engaging the adjacent face of the head 114 of the screw 103. The opposite end of the spring 119 engages a flanged collar 123 slidably mounted upon the rod 122 and having its rear end portion seated against a wear plate 124 secured to the depending flange of the cross member 67 of the yoke 65, as shown in Figure 5. The depending flange of the cross member 67 has an elongated aperture 125 therein adapted to movably receive the rear end portion of the rod 122, as best shown in Figures 4 and 14. A suitable nut 126 is secured to the rear terminal of the rod 122 and is adapted to engage a wear plate 127 secured to the outer face of the cross member 67 of the yoke. The spring 119 and associated parts provide means for cushioning the forward and rearward forces imparted to the operating mechanism by the yoke 67, during operation of the apparatus. The aperture 125 in the cross member 67 permits limited lateral movement of the rod 122 therein, as will be noted by reference to Figure 14.

The means provided for actuating the friction disks 99 and 101 is best shown in Figures 4, 5, and 6, and comprises a spider 128 fixedly mounted upon the sleeve 95. The spider 128 carries a plurality of dogs 129 which are connected by suitable links 131 to a shifter collar 132, mounted for sliding movement upon the sleeve 95. The dogs 129 are adapted to engage an annulus 130 provided upon the clutch disk 99. The annulus 130 has a peripheral groove 140 in which are seated the disk-like heads 150 of a pair of spring-actuated studs 160, carried by arms 170 provided upon the spider 128. The studs 160 function to disengage the clutch disk 99 from the web of the gear 94, when the spider is moved in a direction to free the clutch. A forked member 133 has its intermediate portion pivotally mounted upon a pin 134 shown supported by suitable studs 135 secured to the front wall 78 of the housing 77.

The upper end of the forked member 133 is pivotally connected to one end of a link 136, the opposite end of which is connected to a brake lever 137 mounted upon one end of a brake shaft 138, the upper end of which is supported in a lug 139, and its lower reduced end portion 141 being supported in a socket 120 provided in the upper end of a guide post 142, adjustably secured to the lower wall 81 of the casing by suitable threads 143 and a lock nut 144. A small arm 145 is mounted upon the rod 138 and is adapted for relative rotation thereon.

The friction disk 101 is provided with a brake drum 146 having a brake band 147 encircling it, the ends of which are provided with spaced apertured lugs 148 and 149. These lugs are engaged with the lower reduced end portion 141 of the brake operating shaft 138. If necessary, a suitable spring may be interposed between the lugs 148 and 149 to spread them apart, when the mechanism is operated to release the brake. The hubs of the brake lever 137 and arm 145 are provided with coacting cam faces 152, whereby when the lever 137 is rotated in a direction towards the right, when viewed as shown in Figure 5, and the arm 145 engages a stop pin 153, the lever 137 will rotate relatively to the arm 145, whereby the latter will be forced downwardly by the coacting cam faces 152, resulting in the lug 148 of the brake band being moved in a direction towards the lug 149, whereby the brake band will frictionally engage the brake drum 146 of the friction disk 101, with the result that rotation of the interiorly threaded sleeve 95 will be arrested. The stop pin 153 is adjustably mounted in a threaded socket provided in the rear wall 79 of the housing to provide means for controlling the swinging movement of the arm 145.

*Control mechanism*

The means provided for actuating the forked member 133 and brake lever 137 is best shown in Figure 5, and comprises an arm 155 pivotally connected to the front wall 78 of the housing by means of a link 156. The arm 155 has a pivotal connection with the link 136 connecting together the forked member 133 and brake lever 137. The arm 155 has a head 157 at one end adapted to be received in a slot 158 provided in a clutch rod 159, mounted for sliding movement in suitable guides provided in the walls 78 and 79 of the housing 77, as best shown in Figure 5. When the clutch rod 159 is in the position shown in Figures 4 and 5, the clutch will be in operative position because of the dogs 129 engaging the annulus 130 of the clutch disk 99, and thereby forcing the disk into frictional engagement with the web of the gear wheel 94, whereby the clutch disks 99 and 101 will rotate with the gear. When the clutch disks are thus rotated, the screw 103 will be moved in a direction towards the right, when viewed as shown in Figure 4. It is also to be noted that when the clutch rod 159 is in the position shown in Figures 4 and 5, the brake lever 137 will be in inoperative position, so as to permit the clutch disks to rotate with the gear 94. When the clutch rod 159 is moved in a direction towards the right, when viewed as shown in Figure 5, the arm 155 will be oscillated in a direction towards the right, whereby the link 136 connecting the forked member 143 with the brake lever 137, will be moved in a corresponding direction, thereby translating the shifter collar 132 in a direction towards the left, when viewed as shown in Figure 4, whereby the dogs 129 will move to inoperative positions and render the clutch inoperative. Continued movement of the clutch rod 159 in a rearward direction will cause the brake lever 137 to contract the brake band 147, whereupon rotation of the clutch disks 99 and 101 and also the sleeve 95 will be arrested, and the gear wheel 94 will idle freely between the clutch disks.

The means provided for operating the rod 159 is best shown in Figures 3 and 8, and comprises a tubular member 161 having a movable connection with the rod 159 by means of a connecting link 162, pivotally connected to the rod 159 and rigidly secured to the member 161, by means of suitable pins 163 and 164, respectively, preferably arranged at right angles with respect to each other as shown in Figure 8. The opposite end of the tubular member 161 has a head 165 secured thereto to which is secured an upstanding arm 166, having its upper end pivotally connected to the upper end of a lever 167. The lever 167 is pivotally mounted upon a rail 168 secured to the tractor frame.

A rod 169 is mounted within the tubular member 161 and has its forward end pivotally connected to the lower end of an actuator 171, pivotally mounted upon the arm 166, as shown in Figure 3. A plate 172 is suitably secured to the rear end portion of the rod 169 within the tubular member 161 and has its upper edge projecting through a slot 173 provided in the wall of the member 161. The plate 172 has an inclined slot 174 which is traversed by a pin 175 having its terminals secured in the walls of the member 161. When the rod 169 is moved forwardly by manipulation of the actuator 171, the plate 172 will also be moved forwardly and in an upward direction because of the inclined slot 174, to the position indicated by the dotted lines in Figure 8.

The upper edge of the plate 172 is adapted to engage one end of a member 176 having its opposite end movably seated against the side wall 83 of the housing, as shown in Figures 5 and 8. A threaded stud 177 retains the member 176 in position against the housing wall.

The member 176 is adapted to actuate a latch 178 slidably mounted in a socket provided in the front wall 78 of the housing, and adapted to engage ratchet teeth 179 provided upon the clutch rod 159, whereby the latter may be secured in adjusted position. The latch 178 has its intermediate portion slidably mounted in a socket 181 provided in the member 176 and is retained therein by means of a nut 182 and a square head 183 provided upon the latch. The head 183 is received in a correspondingly shaped recess so as to prevent the latch from relatively rotating in the socket 181. The upper reduced end portion 184 of the latch is slidably received in a guide 185 supported upon a rod 186 having one end secured to the front wall 78 of the housing, as shown in Figure 9. A coiled spring 187 is shown interposed between the guide 185 and a washer 188 seated against a shoulder provided upon the latch 178, as best shown in Figure 8, whereby the spring 187 constantly tends to urge the latch 178 into locking engagement with the clutch rod 159.

From the foregoing, it will readily be understood that when the rod 169 within the tubular member 161 is moved in a forward direction by manipulation of the actuator 171, the plate 172 will move the member 176 into the dotted line position, indicated in Figure 8, whereby the locking bolt 178 will move out of engagement with the clutch rod 159, and thereby permit the latter to be moved forwardly by swinging the lever 167 in a forward direction, as indicated by the full lines in Figure 3. The latch 178 is preferably mounted in a wall of the housing 77 in close proximity to the clutch and brake so as to minimize the usual objectionable looseness commonly found in the control linkage of ordinary controls of this general character.

Operation

In the operation of the novel tractor scraper herein disclosed, the scraper blade is first adjusted to a selected angular position, such as indicated in full and dotted lines in Figure 2, or to the dotted line position indicated at A, in which position the blade will be substantially at right angles to the longitudinal center line of the apparatus. The cutting edge of the blade may then be adjusted with respect to the ground level by means of the hand wheels 58. In some instances, it may be found desirable to elevate the carrying wheels 39 to a position whereby the cutting edge of the blade will be supported entirely upon the ground surface. The operator may then manipulate the hand lever 166—167 to control the operation of the operating mechanism, shown in Figure 4. If the blade is to travel over the surface of the ground with its weight supported entirely thereon, the control lever 167 is so positioned as to cause the clutch disks 99 and 101 and the brake 147 to be in inoperative position. When the above parts are thus positioned, the operating mechanism will have no effect upon the operation of the scraper blade, so that the latter may floatingly follow the contour of the ground. This results because of the sleeve 95 being free to rotate in both directions, when the clutch and brake are released. The threads of the screw 103 are cut at an angle of approximately twenty degrees, which is sufficient to impart rotary movement to the sleeve 95 in either direction, when the screw is axially moved by the rearward and forward movements of the yoke 65.

If the blade is to be held in firm contact with the ground, the control lever 167 is moved backwardly from the position shown in Figures 4 and 5, whereupon the clutch rod 159 will actuate the shifter collar 132 to render the clutch inoperative, and will then actuate the brake lever 137 to set the brake. The screw 103 is then locked against longitudinal movement within the sleeve 95, because of the latter being locked against rotation. When the parts are thus positioned, the coil spring 119 will cushion any jolts or shocks transmitted to the operating mechanism through the thrust frame 8—12—13 and the yoke 65. For example, when the cutting edge of the blade encounters a bump or raised portion in the ground surface, the lifting force exerted against the blade will tend to impart a rearward movement to the yoke 65 which, because of being connected with the rod 122, will be restrained from such movement through the action of the spring 119. When the screw 103 is locked against longitudinal movement, as hereinbefore stated, and a rearward force is directed against the rod 122, the head 121 of the rod 122 will move rearwardly out of engagement with the head 114 of the screw, thereby causing the spring 119 to compress, the opposite end thereof being held against rearward movement by the member 123 which is secured to the cylindrical member 116, as will be clearly understood by reference to Figure 4.

Conversely, when the cutting edge of the blade drops into a depression in the road surface or to a position below the ground level, a forward movement will be imparted to the yoke 65 which will be transmitted to the rear end of the spring 119 through the member 123 mounted upon the rod 122. It will thus be seen that the spring 119 cushions the load exerted against the yoke 65 in its forward and rearward movements, whereby the operating mechanism and rear portion of the tractor is relieved of severe strains.

When the apparatus is being moved from one place to another, the blade 17 may be elevated to an inoperative position by the power of the tractor engine through the operating mechanism connecting the power take-off shaft 3 of the engine with the yoke 65. To thus elevate the blade, the operating lever 167 is thrust forwardly to position the clutch rod 159 substantially as shown in Figures 4 and 5, whereby the shifter collar 132 will be actuated to cause the clutch dogs 129 to move the disk 99 into frictional engagement with the web 98 of the gear wheel 94, whereupon the sleeve 95 will rotate with the gear and thus cause the screw 103 to be axially moved in a rearward direction, whereby a rearward movement will be transmitted to the yoke 65 through the coil spring 119. Such movement of the yoke, as hereinbefore stated, will cause the thrust frame to oscillate about the pivots 9, whereby the scraper blade will be elevated to a position above the ground level, as indicated by the broken lines B in Figure 1.

To avoid damaging the mechanism, should the operator neglect to disengage the clutch from the gear wheel 94, during rearward movement of the screw 103, a safety chain 189 is provided which has one end connected to the rear end of the clutch rod 159 and its opposite end to the cross member 67 of the yoke 65, so that when the yoke reaches a predetermined rearward position, the chain 189 will actuate the clutch rod 159 and automatically render the clutch inoperative, whereby the yoke will be disconnected from the power of the engine. The blade may be retained in an elevated position by the action of the brake 147 which prevents relative rotation of the sleeve 95 when the brake lever 137 is in the dotted line position, indicated in Figure 5.

Another important feature of this invention resides in the means provided for supporting the rear portion of the yoke 65 independently of the operating mechanism, whereby strains and shocks imparted to the yoke will not be transmitted directly to the operating mechanism, but will be taken up by the rear portion of the tractor body.

To thus support the rear portion of the yoke, a supporting rod 192 is secured in a suitable frame 193 which may be suitably bolted to the adaptor bracket 86 by bolts 194 and 195. A bracket 196 is provided upon the rear cross member 67 of the yoke 65 and extends forwardly and upwardly therefrom and has a bearing 197 secured to the forward portion thereof which is slidable upon the supporting rod 192. A suitable compression spring 191 is mounted upon the rod 192 between the bearing 197 and the rear portion of the bracket 193, so that when the bearing 197 moves rearwardly, it may engage and compress the spring 191.

The bracket 193 and rod 192 thus support the entire weight of the rear portion of the yoke, and the connection provided between the yoke and the rod 122 of the operating mechanism permits the yoke to rock about the axis of the rod 192 without transmitting lateral strains to the operating mechanism. The spring 191 functions to cushion shocks imparted to the mechanism when, for example, the blade 17 is in a floating position, and the tractor nose dives into a ditch, causing the blade to raise beyond its normal limit of travel with respect to the tractor.

The angular position of the blade may be conveniently and quickly adjusted from one position to another by oscillating the index beam 21 upon its pivot 22, as hereinbefore described. It will also be noted by reference to Figures 1 and 2 that the index beam 21 serves as a supporting means for the blade 17, and also as a support for the carrying wheels 39. The ends of the blade are adjustable vertically and independently of each other by means of the hand wheels 71, so that the blade may readily be positioned to conform to the incline or slant of the road surface. The adjustable connections between the forward ends of the yoke 65 and the uprights 12 also provide means whereby the vertical movement of the blade may be materially increased, thereby making it possible to position the blade at a considerable distance above the ground level, as indicated at B in Figure 1, and also whereby the blade may be lowered to a position substantially below the ground level, as indicated at C.

The entire apparatus is so constructed as to relieve the tractor body of severe strains or shocks which may be imparted to the scraper and its supporting means during operation. It is also to be noted that the legs 66 of the yoke 65 have universal connections with the upper ends of the uprights 12 of the thrust frames, and that the cross member 18 is pivotally connected to the forward ends of the thrust members 8. In like manner, the rear portion 67 of the yoke 65 is movably connected with the rod 122. By thus movably connecting together all of the above mentioned parts, the scraper blade is free to follow the contour of the ground surface without imparting undue strains to the thrust frames and to the tractor body.

In the drawings, I have shown the tractor provided with a scraper blade of the back filler type, but it is to be understood that an ordinary straight bulldozer blade may be pivotally connected with the forward ends of the thrust members 8 in lieu of the blade shown, without departing from the scope of the invention.

I claim as my invention:

1. The combination with a tractor comprising an engine and a suitable frame, of a thrust frame having pivotal connections with the tractor frame and extending forwardly therefrom and carrying a scraper blade, an operating mechanism for said thrust frame connected with the tractor engine, a rigid frame pivotally connected with said thrust frame at the sides of the tractor and having its rear portion movably connected to said operating mechanism, and means for controlling the operation of said mechanism to vertically adjust the scraper blade.

2. The combination with a tractor of the crawler type comprising an engine and suitable track frames, of a thrust frame having pivotal connections with said track frames at their lower intermediate portions and extending forwardly therefrom and carrying a scraper blade, an operating mechanism for said thrust frame connected with the tractor engine, a substantially U-shaped frame operatively connected with said operating mechanism, and means for pivotally and adjustably connecting said U-shaped frame to said thrust frame and by which the scraper blade may be vertically adjusted independently of said operating mechanism.

3. The combination with a tractor comprising an operator's station, an engine, and a suitable frame, of a thrust frame comprising thrust members having pivotal connections with the tractor frame and extending forwardly therefrom and having their forward ends connected by a suitable cross beam, an index beam pivotally connected with said cross beam and carrying a scraper blade, carrying means adjustably mounted upon said index beam adapted to engage the ground and carry the weight of the scraper blade and its supporting means, means for actuating said carrying means and whereby the scraper blade may be relatively adjusted with respect to the ground, means by which said index beam may be oscillated to angularly adjust said blade, and means for operatively connecting said thrust members with the tractor engine, whereby said thrust frame may be oscillated by the power of the engine to elevate the scraper blade.

4. The combination with a tractor of the crawler type comprising an operator's station, an engine, and suitable track frames, of a thrust frame comprising thrust members having pivotal connections with the track frames and extending forwardly therefrom and having their forward ends connected by a suitable cross beam, an index beam pivotally connected with said cross beam and carrying a scraper blade, brackets adjustably mounted upon said index beam at the ends thereof and having wheels adapted to engage the ground and carry the weight of the scraper blade and its supporting means, means at the operator's station for actuating said brackets to vertically adjust the position of the scraper blade with respect to the ground, and means operatively connecting said thrust members with the tractor engine whereby said thrust frame may be oscillated by the power of the engine to elevate the scraper blade.

5. The combination with a tractor of the crawler type comprising an engine and suitable track frames, of a thrust frame comprising thrust members having their rear end portions pivotally connected to said track frames and having a suitable cross beam pivotally connecting together the forward ends thereof, an index beam pivotally mounted on said cross beam and adapted for angular adjustment thereon in a horizontal plane, a scraper blade mounted on said index beam, and adapted for angular adjustment thereon about a horizontal axis, carrying wheels adjustably mounted at the ends of said index beam adapted to engage the ground and carry the weight of the forward end of the thrust frame and said blade, and whereby the cutting edge of the latter may be relatively adjusted with respect to the ground, and means for retaining said carrying wheels in parallel relation regardless of the position of the scraper blade.

6. The combination with a tractor of the crawler type comprising an operator's station, an engine, and suitable track frames, of a thrust frame comprising thrust members having their rear end portions pivotally connected to said track frames and having a suitable cross beam pivotally connecting together the forward ends thereof, an index beam pivotally connected with said cross beam and adapted for angular adjustment thereon in a horizontal plane, a scraper blade mounted on said index beam, carrying wheels adjustably mounted at the ends of said index beam adapted to engage the ground and carry the weight of the forward end of the thrust frame and said blade, means at the operator's station for independently adjusting said carrying wheels whereby the cutting edge of the blade may be relatively adjusted with respect to the ground, means for retaining said carrying wheels in parallel relation regardless of the position of the scraper blade, and power means at the rear of the tractor by which said thrust members may be oscillated about their pivots to elevate the scraper blade to a position above the ground.

7. The combination with a tractor of the crawler type comprising an engine and suitable track frames, of thrust frames pivotally connected with the lower intermediate portions of said track frames and extending forwardly therefrom and having a scraper blade connected with the forward ends thereof, said thrust frames being substantially triangular in form and extending upwardly from their pivotal connections with said track frames, an operating mechanism connected with the tractor engine, a rigid frame having its rear intermediate portion operatively connected with said operating mechanism, means for adjustably connecting the forward ends of said rigid frame to the upper portions of said thrust frames, and means for supporting the rear end portion of said rigid frame independently of said operating mechanism.

8. The combination with a tractor of the crawler type comprising an engine and suitable track frames, of thrust frames pivotally connected with the lower intermediate portions of said track frames and extending forwardly therefrom and having a scraper blade connected with the forward ends thereof, said thrust frames being substantially triangular in form and extending upwardly from their pivotal connections with said track frames, an operating mechanism connected with the tractor engine, a rigid U-shaped frame having its rear intermediate portion operatively connected with said operating mechanism, and means for adjustably connecting the forward ends of the U-shaped frame to the upper portions of said thrust frames and by which said thrust frames may be adjusted independently of each other to position the blade with respect to the ground.

9. The combination with a tractor of the crawler type comprising an engine and suitable track frames, of a scraper attachment comprising a pair of triangularly shaped thrust frames having pivotal connections with said track frames and extending forwardly therefrom and connected with a scraper blade, an operating mechanism for said thrust frames connected with the tractor engine, a yoke having its rear intermediate portion operatively connected with said operating mechanism, means for pivotally connecting the forward ends of said yoke with the upper portions of said thrust frames, means for slidably supporting the rear portion of said yoke independently of said operating mechanism, and means for cushioning shocks transmitted to said yoke, when the scraper blade is lifted to the limit of its upward movement.

10. The combination with a tractor comprising an engine and a suitable frame, of a scraper attachment comprising a pair of triangularly shaped thrust frames having pivotal connections with the tractor frame and extending forwardly therefrom and connected with a scraper blade, an operating mechanism for said thrust frames mounted upon the rear portion of the tractor and connected with the tractor engine, a yoke having its forward ends pivotally and adjustably connected to the upper portions of said thrust frames, a support secured to the rear portion of the tractor and the rear intermediate portion of said yoke being slidably supported upon said support whereby the yoke may move freely backwardly and forwardly when the apparatus is operated and the scraper blade follows the contour of the ground, means operatively connecting the yoke with said operating mechanism, and means for cushioning shocks transmitted to said yoke, when the scraper blade is lifted to the limit of its upward movement.

11. The combination with a tractor of the crawler type comprising an engine and suitable track frames, of a scraper attachment comprising a pair of triangularly shaped thrust frames having pivotal connections with said track frames and extending forwardly therefrom and connected with a scraper blade, an operating mechanism for said thrust frame mounted at the rear of the tractor, a yoke having its rear intermediate portion operatively connected with said operating mechanism, threaded shafts pivotally and adjustably connecting the forward ends of said yoke with the upper portions of said thrust frames and whereby said thrust frames may be adjusted independently of each other, means for supporting the rear portion of said yoke independently of said operating mechanism and permitting freedom of movement thereof in a direction lengthwise of the tractor and also whereby the yoke may rock in a plane cross-wise of the tractor, and means for cushioning shocks transmitted to said yoke, when the scraper blade reaches the limit of its vertical movement in one direction.

12. The combination with a tractor comprising an engine and suitable track frames, of a pair of thrust frames having pivotal connections with said track frames and extending forwardly therefrom and connected with a scraper blade, an operating mechanism mounted at the rear of the tractor and comprising a housing having a screw therein adapted for longitudinal movement, means by which said screw may be actuated by the power of the tractor engine, and means for operatively connecting said screw with said thrust frames whereby when the screw is actuated, said thrust frames will be oscillated to vertically move the blade.

13. The combination with a tractor comprising an engine and suitable track frames, of a pair of thrust frames having pivotal connections with said track frames and extending forwardly therefrom and connected with a scraper blade, an operating mechanism mounted at the rear of the tractor and comprising a housing having a screw therein adapted for forward and rearward movement, means for operatively connecting said screw with said thrust frames, and means for cushioning shocks transmitted to the screw from said blade.

14. The combination with a tractor comprising an engine and a suitable frame, of thrust members having pivotal connections with the tractor frame and carrying a scraper blade forwardly of the tractor, a yoke pivotally connected to said thrust members and extending rearwardly around the rear portion of the tractor body, an operating mechanism comprising a member adapted for reciprocal movement and having an operative connection with said yoke whereby, when said reciprocal member is moved in one direction, the yoke will be actuated to oscillate said thrust members about their pivots and thereby elevate the scraper blade, and means by which said reciprocal member may be operated by the power of the tractor engine.

15. The combination with a tractor comprising an engine and suitable track frames, of thrust members having pivotal connections with said track frames and carrying a scraper blade forwardly of the tractor, a rigid yoke pivotally connected to said thrust members and extending rearwardly around the rear portion of the tractor body, an operating mechanism at the rear of the tractor comprising a housing having a member therein adapted for reciprocal movement and having an operative connection with said yoke whereby, when said reciprocal member is moved in one direction, the yoke will be actuated to oscillate said thrust members about their pivots and thereby elevate the scraper blade, means by which said reciprocal member may be operated by the power of the tractor engine, and means for movably supporting the rear portion of said yoke independently of said operating mechanism.

16. The combination with a tractor comprising an engine and a suitable frame, of thrust members having pivotal connections with the tractor frame and carrying a scraper blade forwardly of the tractor, a rigid yoke pivotally and adjustably connected to said thrust members and extending rearwardly around the rear portion of the tractor body, an operating mechanism at the rear of the tractor comprising a housing having a member therein adapted for reciprocal movement, shock absorbing means connecting said reciprocal member with said yoke whereby, when said reciprocal member is moved in one direction, the yoke will be actuated to oscillate said thrust members about their pivots and thereby elevate the scraper blade, means by which said reciprocal member may be operated by the power of the tractor engine, and means for movably supporting the rear portion of said yoke independently of said operating mechanism, and whereby the yoke may rock about an axis disposed lengthwise of the tractor to allow for up-and-down movement of said thrust member.

17. The combination with a tractor comprising an engine and suitable track frames, thrust members pivotally connected to said track frames, and extending forwardly therefrom and carrying a scraper blade, a supporting member secured to the rear portion of the tractor, a yoke having its forward ends pivotally and adjustably connected to the upper portions of said thrust members and having its rear portion slidably supported upon said supporting member, an operating mechanism mounted at the rear of the tractor, and comprising a reciprocal member having an operative connection with said yoke, means driven by the power of the tractor engine for longitudinally moving said reciprocal member whereby said yoke may be moved in a direction to elevate the forward ends of said thrust members and the scraper blade, and means for cushioning in both directions, shocks transmitted to said operating mechanism from the scraper blade.

18. The combination with a tractor comprising an engine having a power take-off shaft, and suitable track frames, of members pivotally connected to said track frames and extending forwardly therefrom and supporting a scraper blade, a yoke connected with the upper portions of said members and substantially encircling the rear portion of the tractor, an operating mechanism comprising a housing secured to the rear portion of the tractor, a sleeve mounted for rotary movement within said housing, a gear mounted for relative rotation on said housing and operatively connected with the power take-off shaft of the engine whereby said gear will rotate continuously when said take-off shaft is operating, a screw mounted within said sleeve and having a threaded connection therewith, means for preventing relative rotation of the screw, means for operatively connecting the screw with the rear portion of said yoke, and means by which said gear may be locked to said sleeve to cause the sleeve to rotate simultaneously therewith and thereby axially translate said screw, whereby said yoke will be actuated to vertically move the scraper blade.

19. The combination with a tractor comprising an engine having a power take-off shaft, and suitable track frames, of members pivotally connected to the tractor frame and extending forwardly therefrom and supporting a scraper blade, a yoke connected with the upper portions of said members and substantially encircling the rear portion of the tractor, an operating mechanism comprising a housing secured to the rear portion of the tractor, a sleeve mounted for rotary movement within said housing and having a gear mounted for relative rotation thereon, a pinion connected with the power take-off of the engine and meshing with said gear whereby said gear will rotate continuously when said take-off shaft is operating, a screw having a threaded connection with said sleeve, means for preventing relative rotation of the screw, but permitting longitudinal movement thereof, a rod having a yieldable connection with one end of the screw and having a movable connection with the rear portion of said yoke, means by which said gear may be locked to said sleeve to cause the sleeve to rotate therewith and thereby axially translate said screw, whereby the yoke will be actuated to move said blade, and means for locking the sleeve against rotation, when the gear is released therefrom, whereby said screw and yoke may be locked against movement to retain the scraper blade in an elevated position.

20. The combination with a tractor comprising an engine and a frame, of thrust members pivotally connected to the tractor frame and extending forwardly therefrom and supporting a scraper blade, a yoke having its spaced legs adjustably connected to the upper portions of said thrust members and extending rearwardly therefrom around the rear portion of the tractor, an operating mechanism for said yoke comprising a housing secured to the rear portion of the tractor frame, said housing comprising an internally threaded rotatable sleeve having a screw mounted therein and adapted for longitudinal movement, means for preventing relative rotation of the screw, means yieldably connecting the rear portion of said yoke with said screw, a gear rotatably mounted upon said sleeve and having a driving connection with the tractor engine whereby when the latter is operating, said gear may be rotated, a clutch for locking said gear to said sleeve whereby the latter may be rotated to rearwardly translate said screw to cause the scraper blade to be moved to an elevated position, and means for locking the screw against movement to retain the blade in such elevated position.

21. The combination with a tractor comprising an engine and a frame, of thrust members pivotally connected to the tractor frame and extending forwardly therefrom and supporting a scraper blade, a yoke having its spaced legs adjustably connected to the upper portions of said thrust members and extending rearwardly therefrom around the rear portion of the tractor, an operating mechanism for said yoke comprising a housing secured to the rear portion of the tractor frame, said housing comprising an internally threaded rotatable sleeve having a screw mounted therein and adapted for longitudinal movement, means for preventing relative rotation of the screw, means yieldably connecting the rear portion of said yoke with said screw, a gear rotatably mounted upon said sleeve and having a driving connection with the tractor engine whereby when the latter is operating, said gear will be rotated, a clutch for locking said gear to said sleeve whereby the latter may be rotated to rearwardly translate said screw to cause the scraper blade to be moved to an elevated position, and said clutch, when in inoperative position, permitting said sleeve to rotate freely in opposite directions, caused by longitudinal movement of the screw when the blade floatingly follows the contour of the ground.

22. The combination with a tractor comprising an engine and a suitable frame, of a thrust frame having pivotal connections with the tractor and extending forwardly therefrom and carrying a scraper blade, an operating mechanism for said thrust frame connected with the tractor engine, a rigid frame pivotally connected with said thrust frame at the sides of the tractor and having its rear portion connected to said operating mechanism, and means for controlling the operation of said mechanism to vertically adjust the scraper blade.

23. The combination with a tractor comprising an engine and a suitable frame, of a thrust frame having pivotal connections with the tractor frame and extending forwardly therefrom and carrying a scraper blade, an operating mechanism for said thrust frame connected with the tractor engine, a frame pivotally connected with said thrust frame at the sides of the tractor and having its rear portion connected to said operating mechanism, and means for controlling the operation of said mechanism to vertically adjust the scraper blade.

In witness whereof, I have hereunto set my hand this 5th day of February, 1932.

JOHN R. RITCHIE.